Aug. 21, 1951 L. S. MANSPERGER 2,565,181
VOLT CONTROL FOR ALTERNATING CURRENT WELDING MACHINES
Filed Oct. 6, 1947 2 Sheets-Sheet 1

Lewis S. Mansperger
INVENTOR

BY *Victor J. Evans & Co.*

ATTORNEYS

WITNESS

Aug. 21, 1951 L. S. MANSPERGER 2,565,181
VOLT CONTROL FOR ALTERNATING CURRENT WELDING MACHINES
Filed Oct. 6, 1947 2 Sheets-Sheet 2
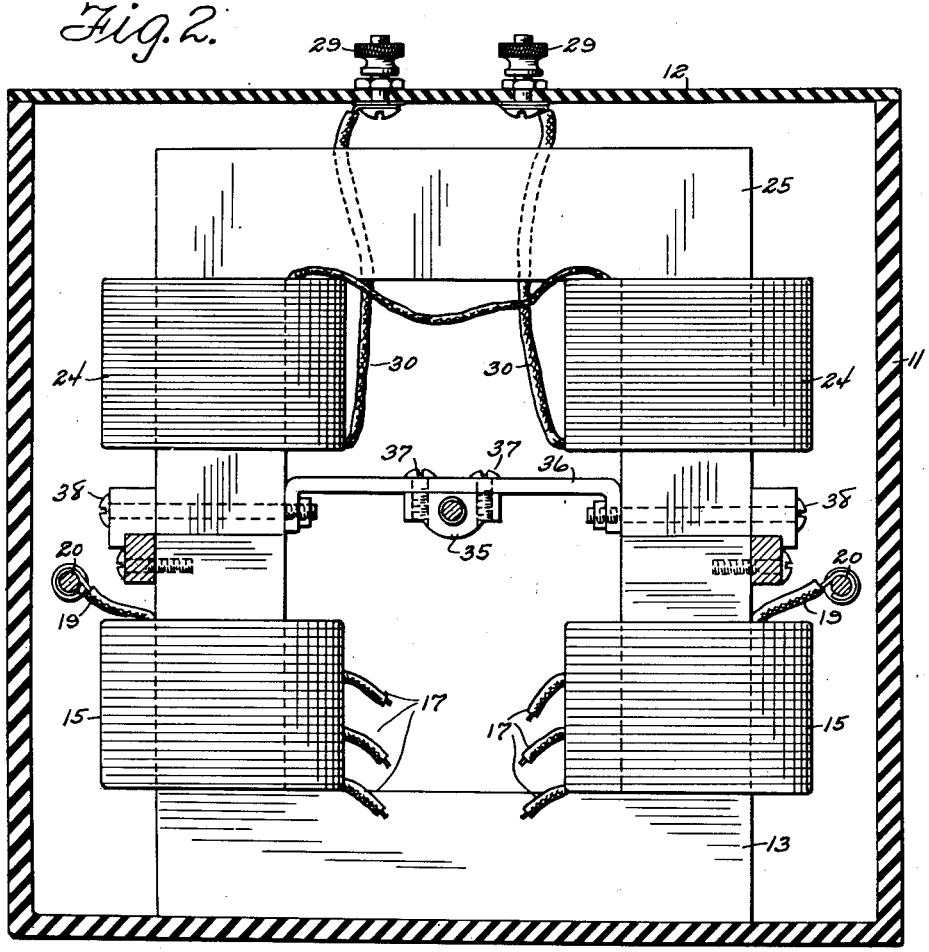
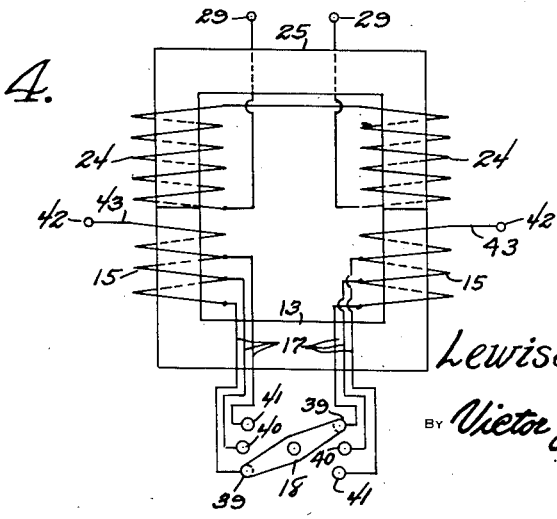

Patented Aug. 21, 1951

2,565,181

UNITED STATES PATENT OFFICE 2,565,181

VOLT CONTROL FOR ALTERNATING CURRENT WELDING MACHINES

Lewis S. Mansperger, Independence, Mo.

Application October 6, 1947, Serial No. 778,255

1 Claim. (Cl. 323—44)

The present invention relates to welding transformers and more particularly to welding transformers of the adjustable type.

It is an object of the invention to provide a welding transformer in which the output voltage and current values are continuously adjustable over a predetermined range.

A further object of the invention is the provision of a plurality of taps by which various ranges of continuous adjustment may be selected.

Still another object of the invention is the provision in a single unit of secondary windings suitable for arc welding in conjunction with other secondary windings appropriate for spot or resistance welding, the adjusting mechanism being common to both sets of windings.

It is a feature of the invention that the continuous adjustment is obtained by sliding the primary winding assembly to decrease the coupling with one of the sets of secondaries while at the same time correspondingly increasing the coupling with respect to the other set of secondary windings. This has the effect of maintaining a magnetic path of relatively constant reluctance facing the magnetic path of the primary winding while the secondary winding conditions are being varied. This in turn has the desired effect of retaining the magnetizing current in the primary winding at a correspondingly relatively constant value.

Other and further objects will become apparent upon reading the following specification together with the accompanying drawing forming a part thereof.

Referring to the drawing:

Fig. 2 shows a sectional front view.

Fig. 4 is a schematic circuit diagram illustrating the electrical connections.

Figure 1:
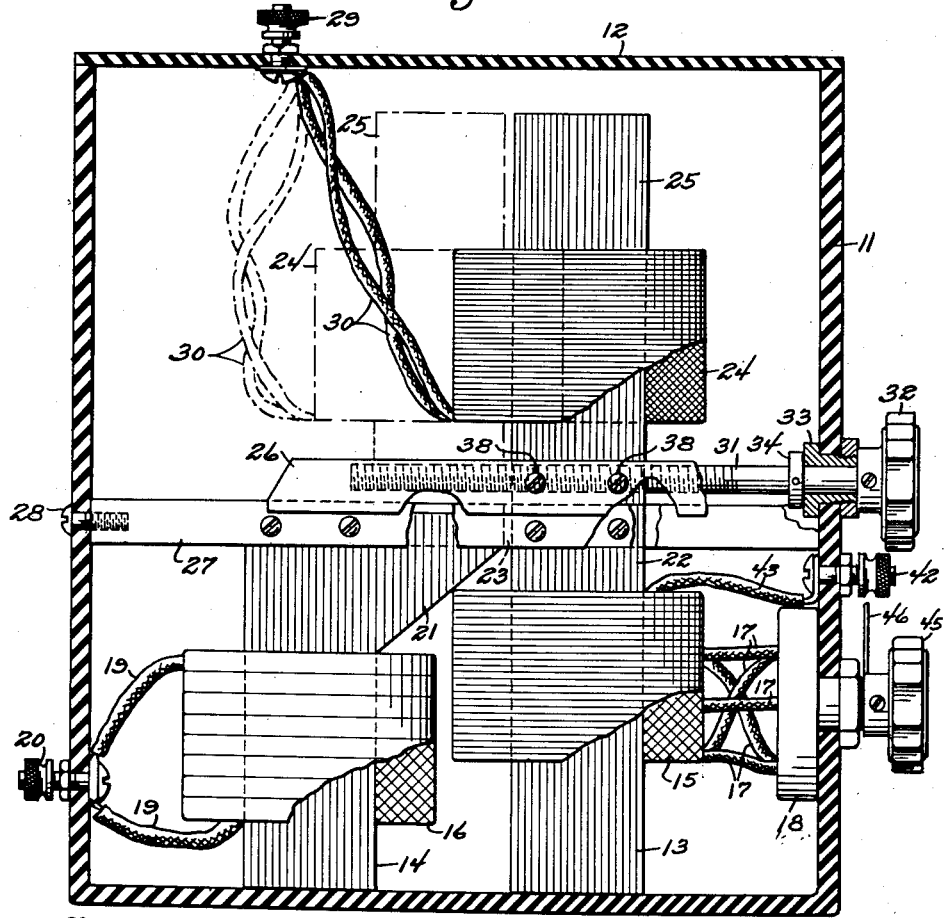
Fig. 1 shows a sectional side view in elevation partly broken away.
Figure 3:
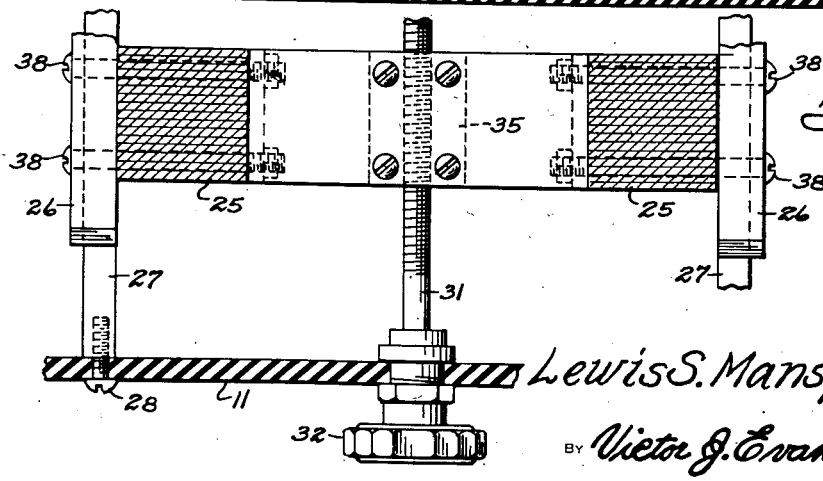
Fig. 3 is a fragmentary view showing the adjusting mechanism.

Referring to Fig. 1, the device comprises a housing 11 provided with a cover 12 which may be removably secured thereto in any desired manner. Fixedly secured to the bottom of housing 11 are two core assemblies 13 and 14 which support the two pairs of secondary windings 15 and 16 respectively. In the example shown, secondary windings 15 are intended for use in arc welding and are provided with a plurality of taps which are connected by lead wires 17 to a tap switch 18. The other pair of secondary windings 16 are wound with relatively few turns of large size wire suitable for delivering the heavy currents required for spot welding or resistance welding. Windings 16 are connected by lead wires 19 to terminals 20, thus making it convenient to connect external circuits to the windings 16.

Core assembly 14 is provided with an extending shoulder portion 21 which terminates in proximity to the pole face portions 22 of core assembly 13 with a small air gap 23 between the adjacent portions of the two core assemblies 13 and 14.

The primary windings 24 are mounted on movable core assembly 25 which is secured to supporting members 26 which are in sliding engagement with guide members 27, these latter being fixedly secured to housing 11 by suitable fastening means such as screws 28.

Current for the energization of primary windings 24 is supplied from a suitable source (not shown) to terminals 29 which are connected by flexible conductors 30 to winding 24. A threaded rod 31 provided with a knob 32 is freely rotatable in bushing 33 and axial displacement is prevented by collar 34. A nut 35 engages the threads of rod 31 and is secured to a transverse member 36 by screws 37. The ends of transverse member 36 are in turn secured to core assembly 25 by means of bolts 38 which also secure supporting members 26.

Secondary windings 15 are each provided with a plurality of taps, symmetrically arranged, which extend via leads 17 to corresponding points on tap switch 18. Tap switch 18 has been shown as being provided with three positions, but a greater or lesser number of positions may be used as desired. The position of tap switch 18 may be changed by turning the handle or knob 45 which is provided with an indicating pointer 46. Switch 18 is shown in the position in which it connects switchpoints 39 together thereby making the full output of windings 15 available. Turning switch 18 to interconnect switchpoints 40 provides an intermediate output and interconnection of switchpoints 41 yields a minimum output in the example illustrated. The selected output is made available for use in arc welding at terminals 42 by conductors 43.

With any setting of tap switch 18, further adjustment is provided by shifting the position of core assembly 25. In Fig. 1, core assembly 25 is shown in position for maximum output from windings 15, being in a position where its pole faces are in direct juxtaposition with the pole faces 22 of core assembly 13. By turning knob 32, threaded rod 31 may be rotated and by cooperation with nut 35 the position of core assembly 25 may be changed to the extent indicated by the dotted lines in Fig. 1. As the position of core assembly 25 is thus changed, the pole face portions thereof are gradually and continuously shifted from juxtaposition with the pole face portions 22 of core assembly 13 to juxtaposition with the pole face shoulder portions 21 of core assembly 14 thereby transferring its energization effect from windings 15 to windings 16. During this shifting the air gap between the pole face portions is maintained at a very small and substantially constant value. As the position of core assembly 25 is changed, the pole faces thereof will oppose either pole face portions 21 or 22 or both in varying degree and the magnetic reluctance presented to core assembly 25 will be retained at a relatively constant value. This constancy is further assisted by the shouldered pole face portions 21 which present a higher reluctance at their narrow tip portions, this reluctance decreasing as core assembly 25 is progressively moved into more direct juxtaposition with the main portion of core assembly 14.

In operation, the arc welding electrodes are connected to terminals 42 in the usual manner. Tap switch 18 is positioned by turning knob 45 to give the desired range of output voltages and the particular voltage appropriate for the welding operation involved is obtained by adjustment of the position of core assembly 25 which adjustment is made by rotation of knob 32.

For spot or resistance welding, the welding circuit is connected by suitable conductors and electrodes to terminals 20. Core assembly 25 is positioned over core assembly 14 to the extent desired to provide the welding current required, this positioning being accomplished by rotation of knob 32.

It will thus be seen that the invention provides a compact and highly adaptable welding transformed suitable for use with a large variety of welding operations.

I have shown what I believe to be the best embodiment of my invention. I do not wish, however, to be limited to the embodiment shown but what I desire to cover by Letters Patent is set forth in the appended claim.

I claim:

In a welding transformer, a housing, a pair of secondary core assemblies arranged in said housing, a single primary core assembly movable with respect to the two secondary core assemblies and arranged to be magnetically coupled predominantly to either of the secondary core assemblies or to both of them in a degree determined by the position of the primary core assembly with respect to the two secondary core assemblies, a shoulder portion extending from one of the pair of secondary core assemblies into proximity with the other secondary core assembly near the portion thereof where the other core assembly is adapted to be magnetically coupled to the primary core assembly, manually-operable means embodying a threaded rod and a knob for adjusting the position of the primary core assembly with respect to the two secondary core assemblies, a tapped secondary winding surrounding a portion of one of the secondary core assemblies, a plurality of taps on said winding, means embodying a manually-operable selector switch for rendering one of the taps effective for utilizing a portion of the winding determined by the position of the selector switch, a handle arranged exteriorly of said housing for actuating said switch, and an indicating pointer for coacting with said handle.

LEWIS S. MANSPERGER.

REFERENCES CITED

The following references are of record in the file of this patent:

UNITED STATES PATENTS

| Number | Name | Date |
| --- | --- | --- |
| 1,653,504 | Moxter | Dec. 20, 1927 |
| 1,698,080 | Agnew | Jan. 8, 1929 |
| 1,873,354 | Stewart | Aug. 23, 1932 |
| 1,971,188 | Kramer | Aug. 21, 1934 |
| 1,984,939 | Nachumsohn | Dec. 18, 1934 |
| 2,098,002 | Guerin | Nov. 2, 1937 |